(12) United States Patent
Rabinowitz

(10) Patent No.: US 7,866,836 B2
(45) Date of Patent: Jan. 11, 2011

(54) FRESNEL SOLAR CONCENTRATOR ARRAY WITH CENTERED UNIVERSAL PIVOTS

(76) Inventor: Mario Rabinowitz, 715 Lakemead Way, Redwood City, CA (US) 94062

( * ) Notice: Subject to any disclaimer, the term of this patent is extended or adjusted under 35 U.S.C. 154(b) by 533 days.

(21) Appl. No.: 12/045,040

(22) Filed: Mar. 10, 2008

(65) Prior Publication Data

US 2008/0170312 A1    Jul. 17, 2008

(51) Int. Cl.
  *G02B 5/08*    (2006.01)
  *F24J 2/38*    (2006.01)
(52) U.S. Cl. .................... 359/851; 359/221.2; 359/853; 359/742; 126/600; 126/684
(58) Field of Classification Search ............. 359/221.2, 359/226.2, 850–851, 853; 126/600–601, 126/605, 683–696
See application file for complete search history.

(56) References Cited

U.S. PATENT DOCUMENTS

| | | | |
|---|---|---|---|
| 4,968,355 A | 11/1990 | Johnson | |
| 6,197,228 B1 | 3/2001 | Sheridon | |
| 6,211,998 B1 | 4/2001 | Sheridon | |
| 6,262,707 B1 | 7/2001 | Sheridon | |
| 6,542,283 B1 | 4/2003 | Sheridon | |
| 6,698,693 B2 | 3/2004 | Davidson et al. | |
| 6,957,894 B2 | 10/2005 | Rabinowitz et al. | |
| 6,959,993 B2 | 11/2005 | Gross et al. | |
| 6,964,486 B2 | 11/2005 | Rabinowitz | |
| 6,975,445 B1 | 12/2005 | Rabinowitz | |
| 6,988,809 B2 | 1/2006 | Rabinowitz | |
| 7,077,361 B1 | 7/2006 | Rabinowitz | |
| 7,115,881 B2 | 10/2006 | Rabinowitz | |
| 7,130,102 B2 | 10/2006 | Rabinowitz | |
| 7,133,183 B2 | 11/2006 | Rabinowitz | |
| 7,156,088 B2 | 1/2007 | Luconi | |
| 7,187,490 B2 | 3/2007 | Rabinowitz | |
| 7,192,146 B2 | 3/2007 | Gross et al. | |
| 7,247,790 B2 | 7/2007 | Rabinowitz | |
| 7,736,007 B2 * | 6/2010 | Rabinowitz | ................. 359/853 |

FOREIGN PATENT DOCUMENTS

WO    PCT/US02/20199    6/2002

* cited by examiner

*Primary Examiner*—James Phan

(57) ABSTRACT

This invention deals with novel method and apparatus for positioning and motion control of the optical elements (mirrors and lenses) of a Fresnel solar concentrator tracking array which approximately eliminates gravitational torque by use of a central universal pivot or gimbals. Linkage torque is produced by induced and/or permanent dipole coupling to an electronic grid to produce angular deflection, and rotational motion that is enhanced by the presence of highly polarizable material. This system is ideally suited for maximization of solar energy focused by the array onto a receiver. Since there are no mechanical linkages, the instant invention is applicable for fabrication from the mini- to the nano-technology realm. The elimination of gravitational torque by balancing the optical elements on a universal pivot or gimbals greatly reduces the power required for the optical elements to track the sun and focus sunlight onto a receiver.

12 Claims, 4 Drawing Sheets

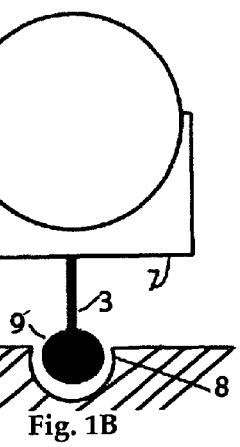
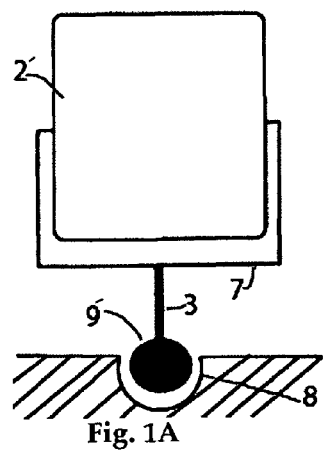
Fig. 1A
Fig. 1B
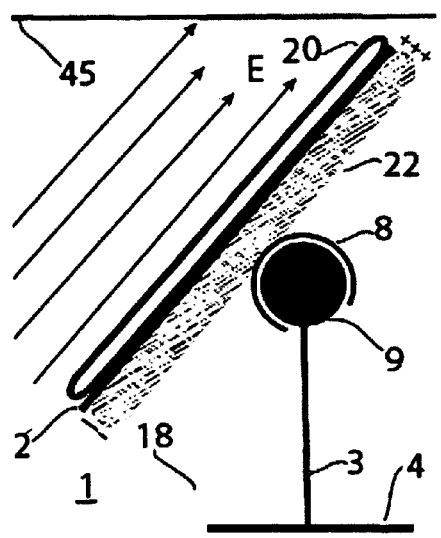
Fig. 2A
Fig. 2B

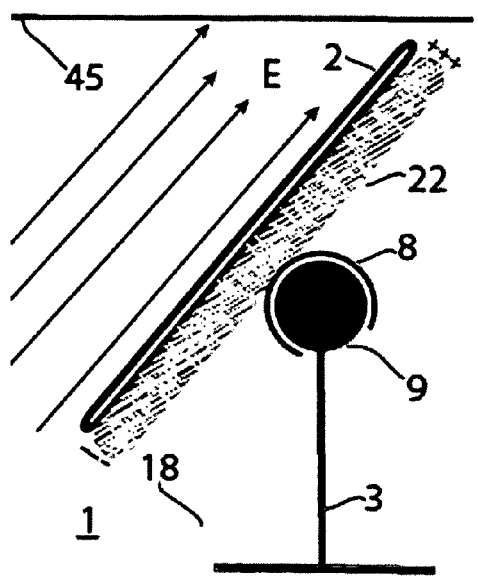
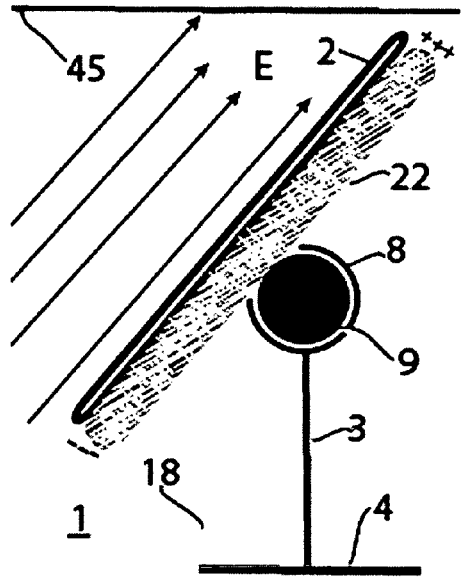
Fig. 3A    Fig. 3B
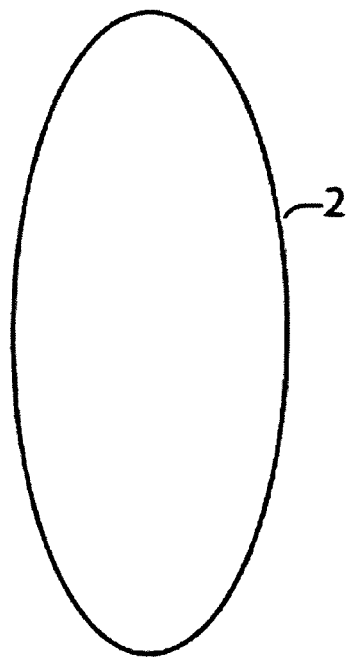
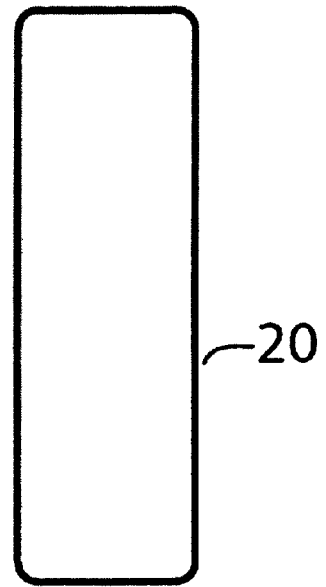
Fig. 4A    Fig. 4B

FRESNEL SOLAR CONCENTRATOR ARRAY WITH CENTERED UNIVERSAL PIVOTS

FIELD OF THE INVENTION

The instant invention relates generally to a Fresnel Solar Energy Concentrator array of universal centered pivots to track and focus the sun by means of permanent and/or induced electric dipole alignment. Electric dipole interaction provides an alignment linkage for the Fresnel mirrors or lenses that are each balanced on universal centered pivots that can rotate or tilt in any direction; or on gimbal pivots. Thus gravitational torque is essentially eliminated or made negligible.

BACKGROUND OF THE INVENTION

This invention provides a better means to achieve affordable solar energy than by conventional means. In the latter, moving one or more large monolithic Fresnel mirrors or lenses generally requires motors and gears that consume a great deal of power. This results in an expensive, bulky, and ponderous system. The present invention functions in solar concentrators and similar equipment much the same as an ordinary lens or three-dimensional parabolic mirror that concentrates light to a small confined two-dimensional-like region; or to a one-dimensional-like thin rectangle (such as is done with a parabolic trough), without the disadvantages of bulk and weight associated with such conventional tracking apparatus.

The angular alignment of the optical elements (mirrors, lenses etc.) is accomplished by means of permanent and/or induced electric dipole alignment of the pivoted lenses rather than with cumbersome motors. Induced electric dipole alignment of rotatable optical elements is described and taught in detail in U.S. Pat. No. 7,187,490, "Induced Dipole Alignment Of Solar Concentrator Balls" by Mario Rabinowitz, issued on Mar. 6, 2007. It may also be helpful to see U.S. Pat. No. 6,964,486, "Alignment of Solar Concentrator Micro-Mirrors" by Mario Rabinowitz, issued on Nov. 15, 2005.

DESCRIPTION OF THE PRIOR ART

No prior art was found related to dipole alignment in electric fields of mirrors or lenses on universal central pivots, serving as elements of a Fresnel solar concentrator array. The prior art has investigated mirrored ball alignment where the balls are confined in concentric cavities; and mirrored ball alignment where the balls are confined between two egg crate like sheets. No prior art was found that utilized electric field alignment of electric dipoles on universal central pivots or gimbals in a Fresnel solar concentrator, light concentrators, or other similar equipment. The balanced universal central pivot structure of the instant invention permits operation without the spherical cavity confinement of the prior art, and if desired operation in air.

INCORPORATION BY REFERENCE

In a solar energy application (as well as other applications), adjustable lens or reflecting elements are an important feature of a Fresnel solar concentrator that tracks the sun and directs the sunlight to a receiver as described in the following patents and scientific paper. The following U.S. patents, and Solar Journal publication related to a "reflecting solar concentrator" are fully incorporated herein by reference.

1. U.S. Pat. No. 7,247,790 by Mario Rabinowitz, "Spinning Concentrator Enhanced Solar Energy Alternating Current Production" issued on Jul. 24, 2007.

2. U.S. Pat. No. 7,187,490 by Mario Rabinowitz, "Induced Dipole Alignment Of Solar Concentrator Balls" issued on Mar. 6, 2007

3. U.S. Pat. No. 7,133,183 by Mario Rabinowitz, "Micro-Optics Solar Energy Concentrator" issued on Nov. 7, 2006.

4. U.S. Pat. No. 7,130,102 by Mario Rabinowitz, "Dynamic Reflection, Illumination, and Projection" issued on Oct. 31, 2006.

5. U.S. Pat. No. 7,115,881 by Mario Rabinowitz and Mark Davidson, "Positioning and Motion Control by Electrons, Ions, and Neutrals in Electric Fields" issued on Oct. 3, 2006.

6. U.S. Pat. No. 7,112,253, by Mario Rabinowitz, "Manufacturing Transparent Lensed Mini-Balls for Solar Energy Concentration and Analogous Applications" issued on Sep. 26, 2006.

7. U.S. Pat. No. 7,077,361, by Mario Rabinowitz, "Micro-Optics Concentrator for Solar Power Satellites" issued on Jul. 18, 2006.

8. U.S. Pat. No. 6,988,809 by Mario Rabinowitz, "Advanced Micro-Optics Solar Energy Collection System" issued on Jan. 24, 2006.

9. U.S. Pat. No. 6,987,604 by Mario Rabinowitz and David Overhauser, "Manufacture of and Apparatus for Nearly Frictionless Operation of a Rotatable Array of Micro-Lenss in a Solar Concentrator Sheet" issued on Jan. 17, 2006.

10. U.S. Pat. No. 6,975,445 by Mario Rabinowitz, "Dynamic Optical Switching Ensemble" issued on Dec. 13, 2005.

11. U.S. Pat. No. 6,964,486 by Mario Rabinowitz, "Alignment of Solar Concentrator Micro-Lenss" issued on Nov. 15, 2005.

12. U.S. Pat. No. 6,957,894 by Mario Rabinowitz and Felipe Garcia, "Group Alignment Of Solar Concentrator Micro-Lenss" issued on Oct. 25, 2005.

13. U.S. Pat. No. 6,843,573 by Mario Rabinowitz and Mark Davidson, "Mini-Optics Solar Energy Concentrator" issued on Jan. 18, 2005.

14. U.S. Pat. No. 6,738,176 by Mario Rabinowitz and Mark Davidson, "Dynamic Multi-Wavelength Switching Ensemble" issued on May 18, 2004.

15. U.S. Pat. No. 6,698,693 by Mark Davidson and Mario Rabinowitz, "Solar Propulsion Assist" issued on Mar. 2, 2004.

16. U.S. Pat. No. 6,612,705 by Mark Davidson and Mario Rabinowitz, "Mini-Optics Solar Energy Concentrator" issued on Sep. 2, 2003.

17. Solar Energy Journal, Vol. 77, Issue #1, 3-13 (2004) "Electronic film with embedded micro-mirrors for solar energy concentrator systems" by Mario Rabinowitz and Mark Davidson.

DEFINITIONS

"Adjustable Fresnel lens" is a variable tracking and focusing ensemble of planar lenses much like a planar Fresnel lens is a focusing transmitting surface. Heuristically, it can somewhat be thought of as the projection of thin variable-angular segments of small portions of a thick focusing lens upon a planar surface whose angles can be adjusted with respect to the planar surface.

"Adjustable Fresnel reflector" is a variable focusing planar reflecting surface much like a planar Fresnel lens is a focusing transmitting surface. Heuristically, it can somewhat be thought of as the projection of thin adjustable angular segments of small portions of a thick focusing mirror upon a planar surface whose angles can be adjusted with respect to the planar surface.

"Concentrator" as used herein in general is an adjustable array of lenses or mirrors for tracking a light source and focusing its light. In a solar energy context, it is that part of a Solar Collector system that directs and concentrates solar radiation onto a solar Receiver.

"Dielectric" refers to an insulating material in which an electric field can be sustained with a minimum power dissipation.

"Dielectric Constant" is the relative static permittivity (or static relative permittivity) of a material as a measure of the extent to which it concentrates electrostatic lines of flux. It is the ratio of the amount of stored electrical energy when an electric field is applied, relative to the permittivity of a vacuum.

"Electric dipole" refers to the polarization of negative and positive charge. This may be permanent as with electrets, or induced.

"Electric field" or "electric stress" refers to a voltage gradient. An electric field can produce a force on charged objects, as well as neutral objects. The force on neutral objects results from an interaction of the electric field on permanent or induced electric polar moments in the object.

"Electrical breakdown" occurs when a high enough voltage or electric field is applied to a dielectric (vacuum, gas, liquid, or solid) at which substantial electric charge is caused to move through the dielectric.

"Electret" refers to a solid dielectric possessing permanent i.e. persistent electric polarization, by virtue of a long time constant for decay of charge separation. It is essentially a permanent electric dipole.

"Fresnel concentrator array" is an array of Fresnel reflectors or lenses that concentrates incident light "Focusing planar lens" is a thin almost planar lens constructed with stepped varying angles so as to have the optical properties of a much thicker convex (or concave) lens. It can be thought of heuristically as the projection of thin equi-angular segments of small portions of a thick lens upon a planar surface. It is a focusing planar focusing transmitting surface.

"Focusing planar mirror" is a thin almost planar mirror constructed with stepped varying angles so as to have the optical properties of a much thicker concave (or convex) mirror. It can heuristically be thought of somewhat as the projection of thin equi-angular segments of small portions of a thick mirror upon a planar surface. It is a focusing planar reflecting surface much like a planar Fresnel lens is a focusing transmitting surface. If a shiny metal coating is placed on a Fresnel lens it can act as a Fresnel reflector.

"Gimbals are a two or more axis mount consisting of two or more rings mounted on axes at right angles to each other. An object mounted on a three ring gimbal can remain suspended in a plane between the rings regardless as to the stability of the base.

"Gimbal lock" occurs when two axes of rotation line up, depriving the availability of the other degree of freedom of rotation.

"Induced Electric dipole" refers to the polarization of negative and positive charge produced by the application of an electric field.

"Macroscopic electric field" is the applied electric field on the basis of the imposed voltage and the gross (macroscopic) geometry of the electrodes, and which is relevant as long as one is not too near the electrodes.

"Optical elements" are the mirrors, reflectors, lenses, focusers, etc. of a concentrator array.

"Torr" is a unit of pressure, where atmospheric pressure of 14.7 lb/in$^2$=760 Torr 760 mm of Hg.

"Receiver" as used herein in general is a system for receiving reflected light such as a solar cell or heat engine. In a solar energy context, it receives concentrated solar radiation from an adjustable lens assembly for the conversion of solar energy into more conveniently usable energy such as electricity.

"Universal pivot" as used herein permits rotation in all directions. As taught in the instant invention, a preferred embodiment is to have a centered universal pivot below the center of mass of balanced optical elements so that they are supported with little or no gravitational torque on them.

SUMMARY OF THE INVENTION

In order for a solar concentrator to operate efficiently, it should track the sun across the sky on a daily basis, so that the elements (mirrors or lenses} always point in the direction of the sun. In the instant invention, electric dipole linkage of each element to a control grid achieves both tracking of the sun, and focusing to a receiver as described in detail herein. This is accomplished with a minimal power consumption by supporting each element with a centered universal pivot, or gimbal so that gravitational torque is eliminated or made negligibly small.

Optical elements such as mirrors are normally made of a conductive metallic coating. In an applied electrostatic field, E, a dipole moment is induced in the metallic conducting material of the mirrors because the charge distributes itself so as to produce a field free region inside the conductor. To internally cancel the applied field E, free electrons move to the end of each conducting mirror anti-parallel to the direction of E, leaving positive charge at the end that is parallel to the direction of E. Another way to think of this in equilibrium is that a good conductor cannot long support a voltage difference across it without a current source. Furthermore, an electrostatic field polarizes and aligns any dielectric associated with a lens or mirror. The mirror has a high aspect ratio of diameter to thickness. The transparent dielectric part of the mirror has a high aspect ratio of diameter to thickness. Similarly a dielectric lens has a high aspect ratio of diameter to thickness. An induced electrostatic dipole in a pivoted conductor in an electrostatic field is somewhat analogous to an induced magnetic dipole in a pivoted ferromagnetic material in a magnetic field, which effect most people have experienced.

The dielectric materials of, and adjacent to the optical elements are polarizable in an applied electrostatic field, E, so that a dipole moment is induced in the dielectric material because the charge distributes itself so as to diminish the electric field inside it. To internally reduce the applied field E, the lens material polarizes antiparallel to the direction of E, making positive the end that is parallel to the direction of E, and the other end negative. When pivoted, a high aspect ratio (length to diameter ratio) ferromagnetic material rotates to align itself parallel to an external magnetic field. In a dielectric, an external applied electric field E induces a dipole by polarizing the dielectric to partially cancel the field E inside it.

Similarly an electrostatic field polarizes and aligns each dielectric element, as well as conducting mirrors used in mirrored elements. Furthermore, a permanent electret dipole can be incorporated in each element to further enhance the dipole field that interacts with the addressable alignment electric field.

Gravitational torque is greatly reduced in the instant invention by using centered universal pivots or gimbals that also provides an increased force positioning system by means of high dielectric materials, to overcome friction and to allow for the use of lower positioning electric fields. It is much easier to manufacture optical elements supported by centered universal pivots or gimbals, than supporting such optical elements inside spherical cavities. In the "Fresnel Solar Concentrator Array With Centered Universal Pivots" that has been developed, the rotatable optical elements (mirrors and lenses) can be aligned to concentrate solar energy on a receiver having dimensions small compared to the dimensions of the array. This permits the focal point of the array to remain focused on the receiver over the course of a day and throughout the year without having to overcome undesirable torque on the optical elements due to the earth's gravity.

The permittivity (directly related to dielectric constant) of the dielectric material is analogous to the permeability of a ferromagnetic material. The higher both are, the larger the induced dipole in the corresponding field and the larger the rotational torque which is the vector product of the net dipole moment and the applied field. A high dielectric constant material of low mass density is preferred as there is a volume aspect to the torque that tends to cancel the volume of the material giving a higher angular acceleration the lower the density of the rotated element. For those materials that are transparent, the dielectric constant is approximately equal to the square of the index of refraction.

The following Table of High Dielectric Constant Materials indicates a wide range of materials from which either opaque or transparent materials can be used as backing for mirrors, and suitable transparent materials can be used with lenses. Even non-transparent materials of high dielectric constant can be incorporated as thin strips of a lens to aid in alignment, while blocking only a small fraction of the incident light. Highly polarizable material in the context of the instant invention can be any of the materials listed below, and preferably has a dielectric constant greater than 4. Since the index of refraction, n, is approximately equal to the square root of the dielectric constant, n is preferably greater than 2. Liquids are included as they could easily be encapsulated and generally are of low density.

Table of High Dielectric Constant Materials

| Dielectric | Dielectric Constant |
|---|---|
| Glass | 3.7-10 |
| Silicon Dioxide | 3.7 |
| Paper | 3.5 |
| Electroactive Polymers | 2-12 |
| Concrete | 4.5 |
| Rubber | 7 |
| Diamond | 5.5-10 |
| Silicon | 11.7 |
| Methanol | 30 |
| Furfural | 42 |
| Glycerol | 47-68 |
| Water | 34-88 |
| Formamide | 84 |
| Titatium Dioxide | 86-173 |
| Strontium Titanate | 310 |
| Barium Strontium Titanate | 15-500 |
| Polymer Composites | >1000 |
| (La,Nb):(Zr,Ti)PbO$_3$ | 500-6000 |
| Barium Titanate | 90-10,000 |
| Conjugated Polymers | 6-100,000 |

It is relevant to consider the dipole interactions between the optical elements (mirrors or lenses). A heuristic analysis shows that this is not a serious problem. The electric field strength of a dipole, Ed is proportional to $1/r^3$, where r is the radial distance from the center of the dipole. The energy in the field is proportional to $(Ed)^2$. Thus the energy of a dipole field varies as $1/r^6$. The force is proportional to the gradient of the field, and hence varies as $1/r^7$. With such a rapid fall off of the dipole interaction force, it can generally be made very small compared to the force due to the applied field E, and to the frictional forces that are normally present. Therefore interaction of the dipole field forces between optical elements, can generally be made negligible.

Although the primary application of the instant invention is for a solar concentrator application, there are a number of other applications such as light concentration, illumination and projection, solar propulsion assist, etc.

In the adjustable Fresnel solar concentrator with induced dipole alignment of pivoted lens that has been developed, the induced dipole aligns the optical elements to concentrate solar energy on a receiver having dimensions small compared to the dimensions of the array. This permits the focal point of the array to remain focused on the receiver over the course of a day and throughout the year.

Receivers, such as photovoltaic cells, convert the solar energy focused and delivered to them by the solar concentrator directly into electrical energy or via heat engines (e.g. Stirling cycle engines) which convert the solar energy into mechanical energy which can be used directly, or indirectly converted to electricity.

There are many aspects and applications of this invention, which provides techniques applicable individually or in combination for positioning of the optical elements of a solar concentrator, light concentration, illumination and projection, solar propulsion assist, and similar equipment. The broad general concept of this invention relates to actuation, motion production and control, and positioning resulting from a permanent and/or induced dipole interaction of pivoted elements in electric fields by an electronic control grid, that is approximately torque-free of the earth's gravitational field. Gravitational torque-free motion is accomplished by balancing each optical element on a universal pivot that is centered below the center of each optical element, or supporting each balanced optical element with gimbals. The instant invention can perform dynamic motion control over a wide range of dimensions from nanometers to centimeters, i.e. from the nano-range, through the micro-range, through the mini-range to the macro-range in a broad scope of applications in micro-electro-mechanical systems (MEMS) such as a solar concentrator, and in similar equipment such as optical switching to macro-positioning. Motorless linear motion, angular deflection, and continuous rotation are achieved without recourse to magnetic fields thus eliminating the need for coils or electromagnetic motors. Furthermore, the instant invention permits less costly and greater ease of manufacture while providing well-defined motion and position control.

It is a general aspect of this invention to provide a positioning optical system requiring a minimal power input by balancing each optical element on a centered universal pivot, or gimbal.

It is a general aspect of this invention to provide a dynamic system for motion control of an optical system.

Another general aspect of this invention provides a positioning system for an optical system.

Another aspect of this invention provides an actuator for an optical system.

Another aspect of this invention is to provide the motive force for an optical system.

Another aspect of the instant invention is to produce motorless motion of the elements of a solar concentrator.

Another aspect of this invention is to cause motorless angular deflection of the elements of a solar concentrator.

An aspect of the invention is to produce motorless continuous rotation of the elements of a solar concentrator.

Other aspects and advantages of the invention will be apparent in a description of specific embodiments thereof, given by way of example only, to enable one skilled in the art to readily practice the invention singly or in combination as described hereinafter with reference to the accompanying drawings. In the detailed drawings, like reference numerals indicate like components.

BRIEF DESCRIPTION OF THE DRAWINGS

FIG. 1A is a front cross-sectional view of a gimbaled square mini-mirror of an adjustable Fresnel reflector concentrator array.

FIG. 1B is a front cross-sectional view of a gimbaled circular mini-lens of an adjustable Fresnel lens concentrator.

FIG. 2A is a cross-sectional side view of a mirror assembly directly supported by a centered universal pivot, that is one optical element of an adjustable Fresnel reflector solar concentrator.

FIG. 2B is a cross-sectional side view of a mirror assembly indirectly supported by a centered universal pivot, that is one optical element of an adjustable Fresnel reflector solar concentrator.

FIG. 3A is a cross-sectional side view of a lens assembly indirectly supported by a centered universal pivot, that is one optical element of an adjustable Fresnel lens solar concentrator.

FIG. 3B is a cross-sectional side view of a lens assembly directly supported by a centered universal pivot, that is one optical element of an adjustable Fresnel lens solar concentrator.

FIG. 4A is a top view of an mini-lens of an adjustable Fresnel lens concentrator.

FIG. 4B is a top view of a rectangular min-mirror of an adjustable Fresnel reflector concentrator.

GLOSSARY

Figure 5A:
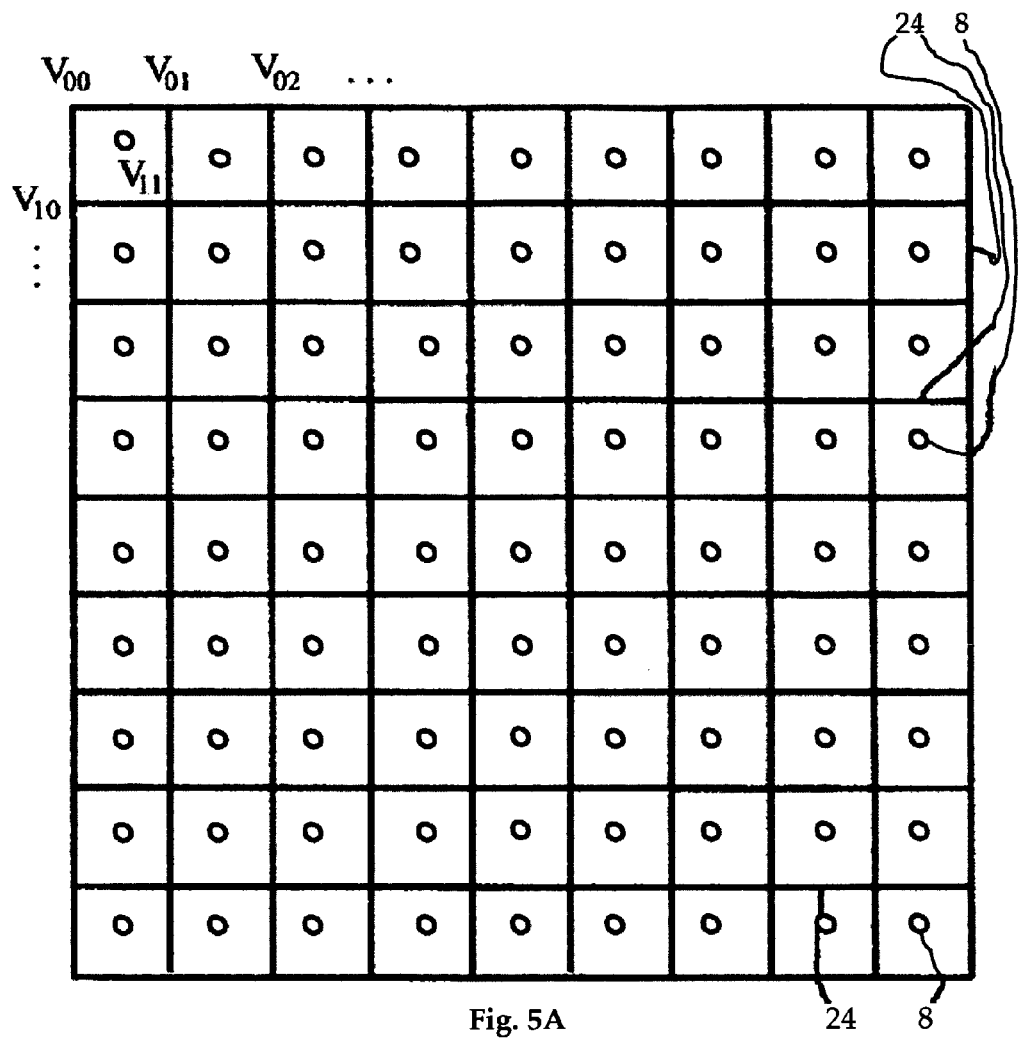
FIG. 5A is a schematic of a generic electronic control grid that may represent a number of different kinds of transistor-less grids; or grids with transistors at junctions, for matrix addressing and alignment of the optical elements of a solar concentrator or other similar optical equipment. Also shown schematically are the centered universal pivots that support the optical elements (mirrors or lenses).

The following is a glossary of components and structural members as referenced and employed in the instant invention with like reference alphanumerics indicating like components:

1—rotatable optical element(s) (such as a lens or mirror)
2—rotatable mini-lens (part of an array)
2'—rotatable mirror (part of an array)
3—stem (rod that supports universal pivot, or gimbal)
4—base to which stem is attached
5t—top of a grid compartment
5b—bottom of a grid compartment
7—gimbal pivot support (for 2 axes of rotation)
8—support bearing (holds universal pivot, or end of gimbal stem)
9—universal pivot (swivel) that can rotate or tilt in any direction
9'—pivot end of gimbal stem
16—receiver (receives or collects light e.g. solar cell, Stirling cycle heat engine)
18—transparent lubricating dielectric fluid
20—transparent dielectric material (such as glass or plastic)
22—high dielectric constant material
24—resistive grid wires
44—electronic control grid (in perspective)
45—transparent sheet on top of grid
E—electric field
V—voltage (number next to V indicates voltage location)
+—positive charge
−—negative charge

DETAILED DESCRIPTION OF THE PRESENTLY PREFERRED EMBODIMENTS

As is described here in detail, the objectives of the instant invention may be accomplished by any of a number of ways separately or in combination, as taught by the instant invention. A tracking solar concentrator has been developed in which the orientation of individual optical elements (lenses) is accomplished by electric dipole interaction between the electric field of a grid and an induced dipole, and/or an electret dipole, to align them consecutively or concurrently without the need for expensive, bulky, and heavy motors. Thus the improved solar concentrator of the instant invention can be less expensive, more reliable, and lighter in weight than conventional solar concentrators.

FIG. 1A is a front cross-sectional view of a square mini-mirror 2' supported by gimbals 7, attached to a stem 3 mounted on a pivot 9' that is supported by a bearing 8. The pivot 9' is a ball so that the angle of the stem 3 can be adjusted to be vertical when the base is inclined with respect to the horizontal. After the vertical adjustment is made, the pivot 9' is constrained for rotation about the vertical axis only, as there would be a gravitational torque if the stem is allowed to tilt. A restraint collar attached to the base can restrict rotation of the stem 3 about a vertical axis.

This mini-mirror 2' is one optical element of an adjustable Fresnel reflector solar concentrator array. A mini-lens could replace the mini-mirror 2', as in FIG. 1B, to be an optical element of an adjustable Fresnel lens solar concentrator array.

FIG. 1B is a front cross-sectional view of a circular lens 2 supported by gimbals 7, attached to a stem 3 mounted on a pivot 9' that is supported by a bearing 8. The pivot 9' is a ball so that the angle of the stem 3 can be adjusted to be approximately vertical when the base is inclined with respect to the horizontal. After the vertical adjustment is made, the pivot 9' is constrained for rotation about the vertical axis by means of collar, to minimize gravitational torque.

Non-transparent materials of high dielectric constant can be incorporated as thin strips on the lens 2 to aid in alignment, while blocking only a small fraction of the incident light. For example this could be along the vertical edges of 2 in this figure. Even high dielectric constant liquids can easily be encapsulated in a hollow lens to enhance the alignment torque.

This lens 2 is one optical element of an adjustable Fresnel lens solar concentrator array. A mirror could replace the lens 2, as in FIG. 1A, to be an optical element of an adjustable Fresnel reflector solar concentrator array.

FIG. 2A is a cross-sectional side view of a mirror 2' supported by a central universal pivot (ball) 9, that is one optical element 1 of an adjustable Fresnel reflector solar concentrator. Adjacent to the back of the mirror is a high dielectric constant material 22. Adjacent to the front of the mirror is a transparent material 20, such as glass or plastic. The universal pivot (ball) 9 is attached behind the mirror assembly directly underneath the center of mass of the balanced mirror assembly to rotate or tilt in any direction, and is supported by a bearing 8 on a stem 3 fixed to the base 4. A transparent sheet 45 allows light to enter from the top and covers the optical element 1.

The mirror and dielectrics have been polarized as indicated by the + and − signs, and aligned by the applied electric field E. An electret (which is the electrostatic analogue of a magnet) may be sandwiched between the dielectric material 22 and the mirror 2 to further enhance the net dipole field.

FIG. 2B is a cross-sectional side view of a mirror 2' supported by a universal centered support bearing 8, that is one optical element 1 of an adjustable Fresnel reflector solar concentrator. Adjacent to the back of the mirror is a high dielectric constant material 22. Adjacent to the front of the mirror is a protective transparent material 20, such as glass or plastic. The universal pivot (ball) 9 is attached to the stem 3 which is fixed to the base 4. A centered support bearing 8 is attached to the back of the mirror assembly so that it can rotate or tilt in any direction on the universal pivot (ball) 9. The support bearing 8 is directly underneath the center of mass of the balanced mirror assembly.

A transparent sheet 45 covers the optical element 1 for light to enter from the top. The sheet 45 also serves to contain the transparent lubricating dielectric fluid 18. A high dielectric strength fluid 18 is preferable to lubricate the universal pivot (ball) 9, and also to increase the electrical breakdown field, permitting the application of a higher electric field E. The fluid 18 also serves as a corrosion resistant medium.

The mirror and dielectrics have been polarized as indicated by the + and − signs, and aligned by the applied electric field E. An electret (which is the electrostatic analogue of a magnet) may be sandwiched between the dielectric material 22 and the mirror 2 to further enhance the net dipole field.

FIG. 3A is a cross-sectional side view of a transparent lens 2 supported by a universal centered support bearing 8, that is one optical element 1 of an adjustable Fresnel lens solar concentrator. Adjacent to the back of the lens 2 is a transparent high dielectric constant material 22. The universal pivot (ball) 9 is attached to the stem 3 which is fixed to the base. A central support bearing 8 is attached to the back of the mirror assembly so that it can rotate or tilt in any direction on the universal pivot (ball) 9. The support bearing 8 is directly underneath the center of mass of the mirror assembly.

A transparent sheet 45 covers the optical element 1 for light to enter from the top. The sheet 45 also serves to contain the transparent lubricating dielectric fluid 18. A high dielectric strength fluid 18 not only lubricates the universal pivot (ball) 9, but also increases the electrical breakdown field, permitting the application of a higher electric field E. A positive feedback loop can be utilized to optimize the tracking and focusing of the solar concentrator lens array when there is a large mismatch between the index of refraction (or equivalently the dielectric constant) of the fluid 18 and that of the lens 2.

The mirror and dielectrics have been polarized as indicated by the + and − signs, and aligned by the applied electric field E. A transparent electret (which is the electrostatic analogue of a magnet) may be sandwiched between the dielectric material 22 and the mirror 2 to further enhance the net dipole field.

FIG. 3B is a cross-sectional side view of a lens 2 supported by a centered universal pivot (ball) 9, that is one optical element 1 of an adjustable Fresnel reflector solar concentrator. Adjacent to the back of the mirror is a transparent high dielectric constant material 22. The universal pivot (ball) 9 is attached behind the mirror assembly directly underneath the center of mass of the mirror assembly to rotate or tilt in any direction, and is supported by a bearing 8 on a stem 3 fixed to the base 4. A transparent sheet 45 allows light to enter from the top and covers the optical element 1. The sheet 45 also serves to contain a transparent lubricating dielectric fluid 18. A high dielectric strength fluid 18 not only lubricates the universal pivot (ball) 9, but also increases the electrical breakdown field, permitting the application of a higher electric field E. A positive feedback loop can be utilized to optimize the tracking and focusing of the solar concentrator lens array when there is a large mismatch between the index of refraction (or equivalently the dielectric constant) of the fluid 18 and that of the lens 2.

The mirror and dielectrics have been polarized as indicated by the + and − signs, and aligned by the applied electric field E. An electret (which is the electrostatic analogue of a magnet) may be sandwiched between the dielectric material 22 and the mirror 2 to further enhance the net dipole field.

FIG. 4A is a top view of an oval mini-lens 2 of an adjustable Fresnel lens concentrator. This oval figure illustrates adequate symmetry about the center of mass for balancing a uniform lens assembly on a centered universal pivot or gimbal. An induced electric dipole and/or a permanent electric dipole (electret) interaction between such an optical element and a control grid achieves alignment of the element.

FIG. 4B is a top view of a rectangular mini-mirror of an adjustable Fresnel reflector concentrator showing the protective transparent dielectric material 20 on top of the mirror. This rectangular figure is one of a multitude with symmetry about the center of mass for balancing a uniform mirror (or lens) assembly on a centered universal pivot or gimbal. An induced electric dipole and/or a permanent electric dipole (electret) interaction between such an optical element and a control grid achieves alignment of the element.

FIG. 5A is a schematic top view showing an electronic control grid with resistive grid wires 24 for matrix addressing and alignment of the optical elements of a solar concentrator or other similar optical equipment. Also shown schematically are the centered universal bearings 8 which support the universal pivots described earlier and designated as 9. The term "equipment" is used in the instant invention to stand for solar energy concentrators that may be of the Fresnel reflector or lens variety, or other types and equipment requiring addressing and alignment, such as other concentrators, and display equipment. Such a grid can be laid on the top and bottom of the equipment, on the top of the equipment with a ground plane on the bottom of the equipment, etc. In order to avoid having several similar looking figures, this schematic may be thought of as a representation of any one of several addressing grid arrays.

The control grid may be a wire grid array with one set of parallel wires on top of the equipment, separated and insulated from an orthogonal set of wires (that are parallel to each other) on the bottom of the equipment. It may be an actual interconnected grid with Thin Film Transistors (TFTs), tunneling junction transistors (as used in flash memories), or similar devices at each of the grid junctions. In this case it is preferable to use polymer based transistors for flexibility. The grid 33 may be a segmented array with each square being a separate insulated slab (cf. to U.S. Pat. No. 6,964,486). In this case, the horizontal and vertical lines shown in FIG. 1 represent insulation between adjacent segments or slabs. The common element of all of these embodiments is the ability to impress the voltage Vij at the ij th node either statically or by means of a traveling wave. To minimize power dissipation, it is desirable to make the grid electrodes (edges that delineate the grid compartments such as 5t and 5b of FIGS. 5B and 5C) highly resistive so that a given voltage drop is accomplished with a minimum of current flow and hence with a minimum of power dissipation. The bus bars that bring the voltage to the grid electrodes may have a higher conductivity (lower resistance). A processor sends signals via bus bars to establish voltages from a power supply to each corner of a grid compartment (cf. FIGS. 5B and 5C) whose edges are grid electrodes made of a highly resistive thin and narrow conductor.

Figure 5B:
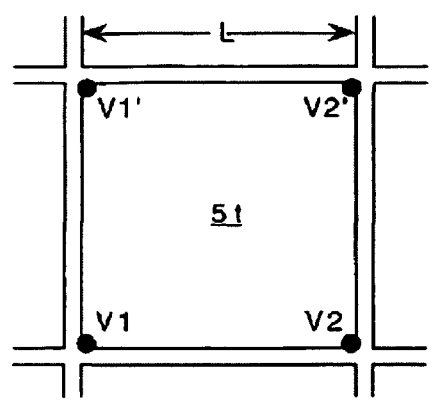
FIG. 5B is a schematic top view of an array of partitioned highly resistive electrodes showing in detail a top electrode of an electronic control grid for rotating the optical elements of a solar concentrator or other similar optical equipment. This schematic can represent either passive or active addressing as will be explained in the detailed description.

FIG. 5B represents a top view of an array of grid compartments with grid spacing L showing in detail a top view of one such top grid compartment 5t and the voltages at its four corners V1, V2, V1' and V2'. Each grid electrode is made of a highly resistive thin and narrow conductor.

Figure 5C:
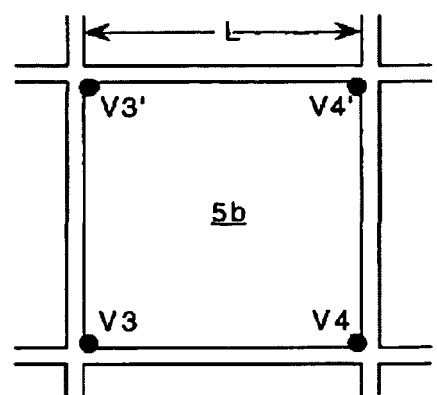
FIG. 5C represents a schematic bottom view of an array of partitioned highly resistive electrodes showing in detail a view of a bottom electrode and the voltages at its four corners.

FIG. 5C represents a bottom view of an array of grid compartments delineated by highly resistive electrodes with grid spacing L showing in detail a view of a bottom grid compartment 5b and the voltages at its four corners V3, V4, V3' and V4'.

Figure 5D:
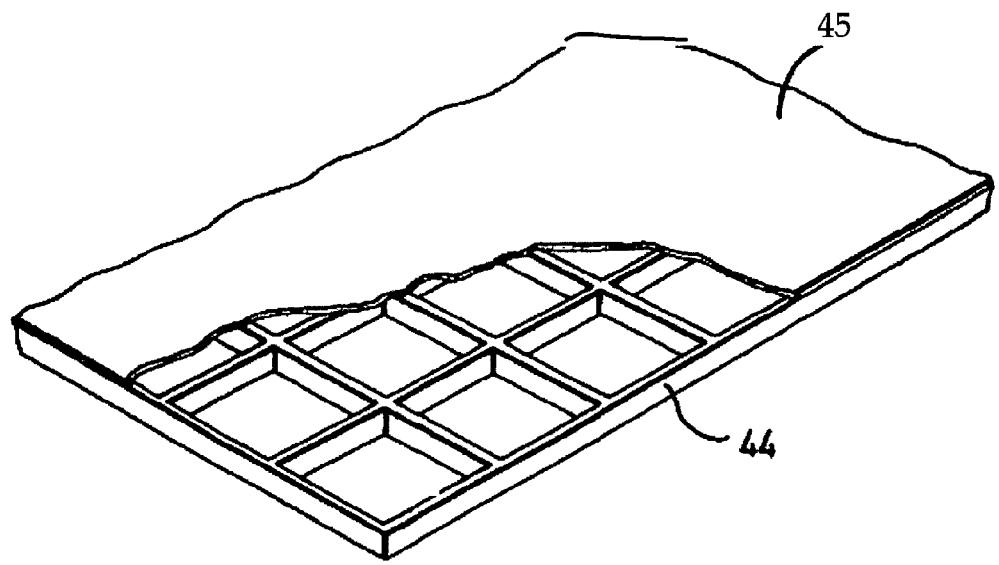
FIG. 5D is a cut-away perspective of a schematic control grid showing a transparent sheet on top of the grid.

FIG. 5D is a cut-away perspective of a schematic electronic control grid showing a transparent sheet 45 on top of the grid. The sheet 45 protects the optical elements (mirrors, lenses etc.) and permits an uninterrupted duty cycle of the concentrator, so that the transparent sheet can be cleaned when it becomes grimy, while the lenses continue to perform their duty. If a fluid is used, for example, to increase the dielectric strength (breakdown voltage), the sheet 45 also functions to seal in the fluid such as vacuum, oil, elevated pressure gas, etc.

Figure 6A:
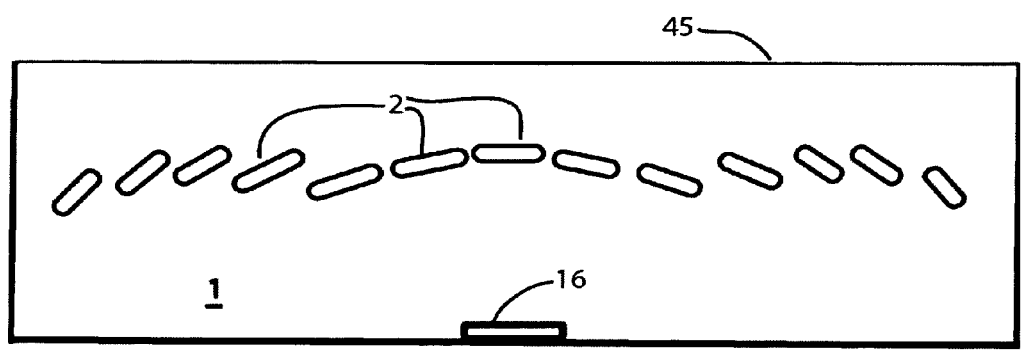
FIG. 6A is a cross-sectional side view of an array of rotatable lenses, focusing incident light onto a receiver.

FIG. 6A is a cross-sectional side view portion of an array of optical elements 1 composed of planar or convex rotatable lenses 2 (supported by universal pivots that are not shown in this figure), covered by a transparent sheet 45, focusing light that is incident from the top onto a receiver 16. High dielectric constant liquids can easily be encapsulated in a hollow lens 2 to increase the dipole interaction and enhance the alignment torque.

The entire array of optical elements 1 may be immersed in a transparent lubricating fluid, or simply be in air. The receiver 16 is shown inside the vessel containing the array of lenses 2, as this protects the receiver; however the receiver 16 may be outside the vessel. If viewed from the top, the array of lenses 2 may have an outer perimeter that is circular, square, rectangular, etc. When the receiver 16 is a thin rectangle, the array of lenses 2 has a line symmetry whose axis corresponds to that of the receiver.

An array of tracking and focussing lenses is specifically shown in this figure for clarity, to depict a Fresnel lens concentrator. A similar array of mirrors would function as a Fresnel reflector concentrator to track a source of light and reflect focused light to the receiver 16, as shown in many of the patents listed earlier in INCORPORATION BY REFERENCE.

Figure 6B:
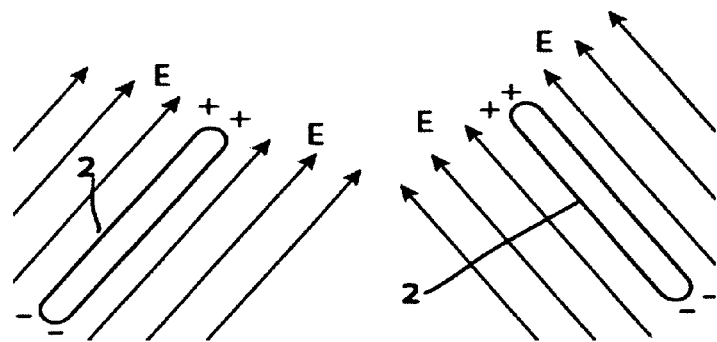
FIG. 6B is a cross-sectional side view of two of the rotatable lenses, at opposite sides of the axis of symmetry, of the array of lenses shown in FIG. 6A. These two lenses have been polarized and aligned by each separately applied electric field E.

FIG. 6B is a cross-sectional side view of two of the rotatable lenses 2, at opposite sides of the axis of symmetry, of the array of lenses shown in FIG. 6A. These two lenses 2 are electrically polarized as indicated by the + and − charges at their ends, and aligned by each applied electric field E.

DISCUSSION

Now that the instant invention has been described and the reader has a reasonable understanding of it, we can more clearly discuss its advantages with respect to other possible concentrator arrays.

1. One of the most important advantages of the invention is related to the elimination or near-elimination of gravitational torque on the optical elements by having each element balanced on a universal pivot or gimbal. Either pivot structure has the advantage of reducing the electric field required for alignment, and makes the system of the instant invention superior to those using electromagnetic motors. Although the pivots are shown below the optical elements, the pivots could also support them from above. The universal pivot below the optical elements is a preferred embodiment.

To have only one or a few motors accomplish alignment of an array by mechanical coupling means such as long rods, gears, turnbuckles, etc. would be a slow, cumbersome, and painstaking process. In a cloudless sky, speed of alignment may not be critical for a solar concentrator, due to the slowly changing position of the sun relative to the earth. However with fast moving clouds, speed can be a decisive factor. Even in a cloudless sky, speed of alignment becomes more critical at high concentration factors.

2. The power requirements to produce a given desired alignment by means of an induced and/or permanent electric dipole interaction with the electric fields of the control grid mechanisms of the instant invention are greatly reduced as gravitational torque does not need to be overcome.

3. Electromagnets in general and electromagnetic motors in particular become quite inefficient as they are scaled down to the mini or nano size range. The present invention is more amenable to miniaturization such as required in nanotechnology.

SCOPE OF THE INVENTION

While the instant invention has been described with reference to presently preferred and other embodiments, the descriptions are illustrative of the invention and are not to be construed as limiting the invention. Thus, various modifications and applications may occur to those skilled in the art without departing from the true spirit and scope of the invention as summarized by the appended claims together with their full range of equivalents. It is to be understood that in said claims, ingredients recited in the singular are intended to include compatible combinations of such ingredients wherever the sense permits. It should be recognized that the methods and apparatus of this invention can be used in other contexts than those explicitly described herein. It is also to be understood that the following claims are intended to cover all of the generic and specific features of the invention herein described, and all statements of the scope of the invention which, as a matter of language, might be said to fall there between.

The invention claimed is:

1. A solar concentrator system comprising
   a) an array of adjustable optical elements;
   b) said optical elements each mounted above its respective pivot;
   c) said pivot mounted directly below the center of mass of each optical element;
   d) said mounting of pivot increasing mechanical stability of orientation of each of said optical elements;
   e) polarizable dielectric material bonded to the posterior side of said optical elements;
   f) said optical elements coupled to an electronic control grid;
   g) said control grid activated by a digital processor;
   h) dipole linkage with the control grid to rotate said optical elements; and
   i) said optical elements track and focus sunlight.

2. The apparatus of claim 1, wherein said polarizable material is chosen from the group Electroactive Polymers, Conjugated Polymers, Silicon, Titatium Dioxide, Strontium Titanate, and Barium Titanate.

3. The apparatus of claim 1, wherein said pivot is a universal pivot.

4. The apparatus of claim 1, wherein said pivot is at least one gimbal.

5. The apparatus of claim 1, wherein said highly polarizable material is chosen from the liquid group Methanol, Furfural, Glycerol, Water, and Formamide.

6. The apparatus of claim 1, wherein said highly polarizable material is chosen from the group Silicon Dioxide, Paper, Concrete, Rubber, and Diamond.

7. A method of concentrating light comprising the steps of
   a) placing optical elements in the form of a moveable Fresnel concentrator array;
   b) mounting said optical elements above at least one universal pivot;
   c) said universal pivot attached directly below the center of mass of each optical element;
   d) bonding polarizable dielectric material to the posterior side of said optical elements;
   e) dipole coupling said optical elements to an electronic control grid;
   f) activating said control grid by a processor;
   g) linking said dipoles to said grid; and
   h) tracking and focusing said light with said optical elements.

8. The method of claim 7, wherein said highly polarizable material is chosen from the group $(La,Nb):(Zr,Ti)PbO_3$.

9. The method of claim 1, wherein said highly polarizable material is chosen from the group Polymer Composites.

10. The method of claim 7, wherein said optical elements are chosen from the group mirrors and lenses.

11. The method of claim 7, wherein said optical elements are attached to a polarizable material of dielectric constant greater than 4.

12. The method of claim 7, wherein said optical elements are covered by a transparent sheet.

* * * * *